United States Patent
Bergweiler et al.

(10) Patent No.: US 10,654,335 B2
(45) Date of Patent: May 19, 2020

(54) THERMAL ENERGY STORAGE SYSTEMS

(71) Applicant: DENSO International America, Inc., Southfield, MI (US)

(72) Inventors: Alec Bergweiler, Farmington Hills, MI (US); Bradley Brodie, Milford, MI (US); Robert Brinker, Ortonville, MI (US)

(73) Assignee: DENSO International America, Inc., Southfield, MI (US)

( * ) Notice: Subject to any disclaimer, the term of this patent is extended or adjusted under 35 U.S.C. 154(b) by 460 days.

(21) Appl. No.: 15/182,149

(22) Filed: Jun. 14, 2016

(65) Prior Publication Data

US 2017/0355245 A1 Dec. 14, 2017

(51) Int. Cl.
*B60H 1/00* (2006.01)
*B60H 1/06* (2006.01)
*B60K 11/02* (2006.01)

(52) U.S. Cl.
CPC ..... *B60H 1/00257* (2013.01); *B60H 1/00314* (2013.01); *B60H 1/00778* (2013.01); *B60H 1/06* (2013.01); *B60K 11/02* (2013.01)

(58) Field of Classification Search
CPC ............ B60H 1/00257; B60H 1/00314; B60H 1/00778; B60H 1/06; B60K 11/02
See application file for complete search history.

(56) References Cited

U.S. PATENT DOCUMENTS

| | | | | |
|---|---|---|---|---|
| 3,645,327 A | * | 2/1972 | Henley | B60N 3/16 165/51 |
| 4,309,967 A | * | 1/1982 | Southard | F02N 19/10 123/142.5 R |
| 5,636,598 A | * | 6/1997 | Moore, Jr. | F23L 17/005 110/162 |
| 6,889,724 B2 | * | 5/2005 | Awad | F01P 11/0276 141/65 |
| 8,151,753 B2 | | 4/2012 | Kamiyama et al. | |
| 9,850,873 B2 | * | 12/2017 | Henley | F02N 19/02 |
| 2008/0275600 A1 | | 11/2008 | Rask et al. | |
| 2009/0071428 A1 | * | 3/2009 | Kamiyama | B60H 1/00314 123/142.5 R |
| 2009/0107974 A1 | * | 4/2009 | Testa | B60H 1/034 219/208 |
| 2012/0031439 A1 | * | 2/2012 | Richie | B08B 3/026 134/34 |
| 2012/0168118 A1 | * | 7/2012 | Myers | B60L 11/14 165/51 |
| 2013/0145996 A1 | * | 6/2013 | Cooper | F22D 5/00 122/31.2 |
| 2013/0193221 A1 | * | 8/2013 | Buescher | F24H 9/2021 237/8 A |

(Continued)

FOREIGN PATENT DOCUMENTS

DE 4041626 C1 4/1992
DE 4036392 A1 5/1992

*Primary Examiner* — Lindsay M Low
*Assistant Examiner* — Ruben Picon-Feliciano
(74) *Attorney, Agent, or Firm* — Harness, Dickey & Pierce, P.L.C.

(57) ABSTRACT

A thermal energy storage system for a vehicle. The system includes a tank that is external to the vehicle. The tank is configured to receive liquid from the vehicle, and store the liquid at or above a predetermined temperature prior to the liquid being returned to the vehicle.

10 Claims, 3 Drawing Sheets

(56) References Cited

U.S. PATENT DOCUMENTS

| | | | |
|---|---|---|---|
| 2015/0165871 A1* | 6/2015 | Miller | B60H 1/032 237/28 |
| 2016/0010892 A1* | 1/2016 | Kimura | F24H 8/00 122/14.21 |
| 2016/0084197 A1 | 3/2016 | Davis | |
| 2016/0102645 A1* | 4/2016 | Henley | F02N 19/02 219/205 |
| 2017/0207745 A1* | 7/2017 | Ishihara | H02S 40/44 |

* cited by examiner

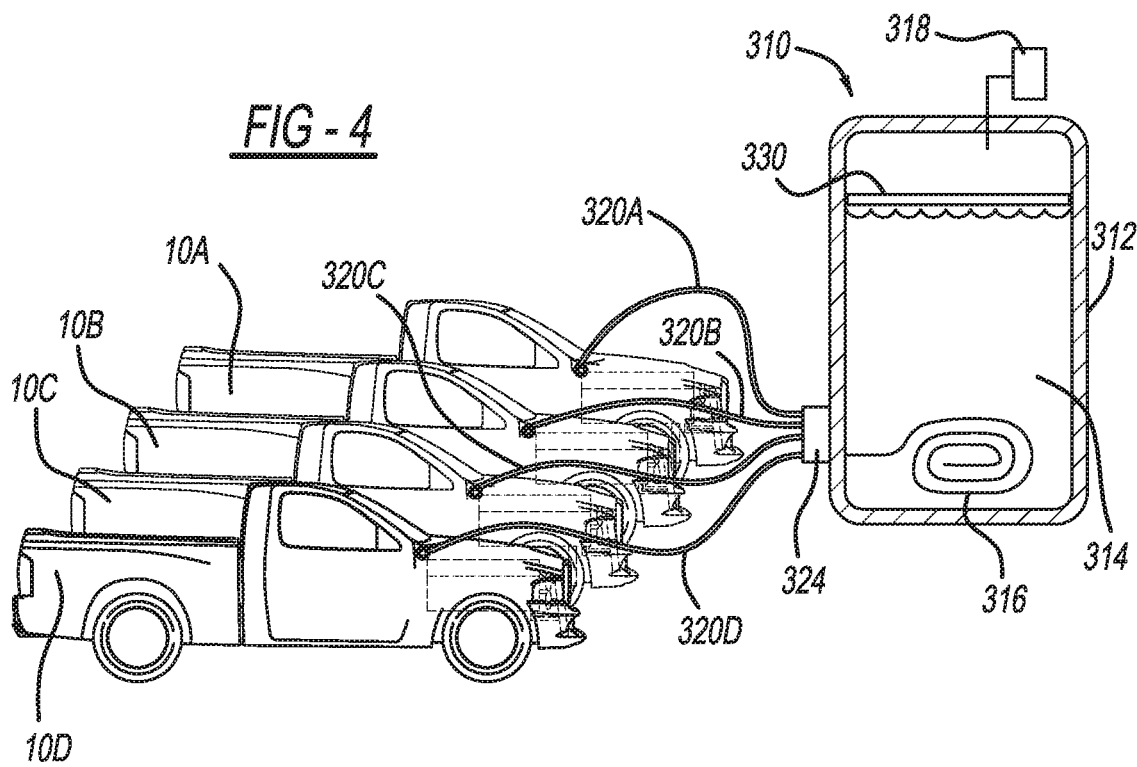
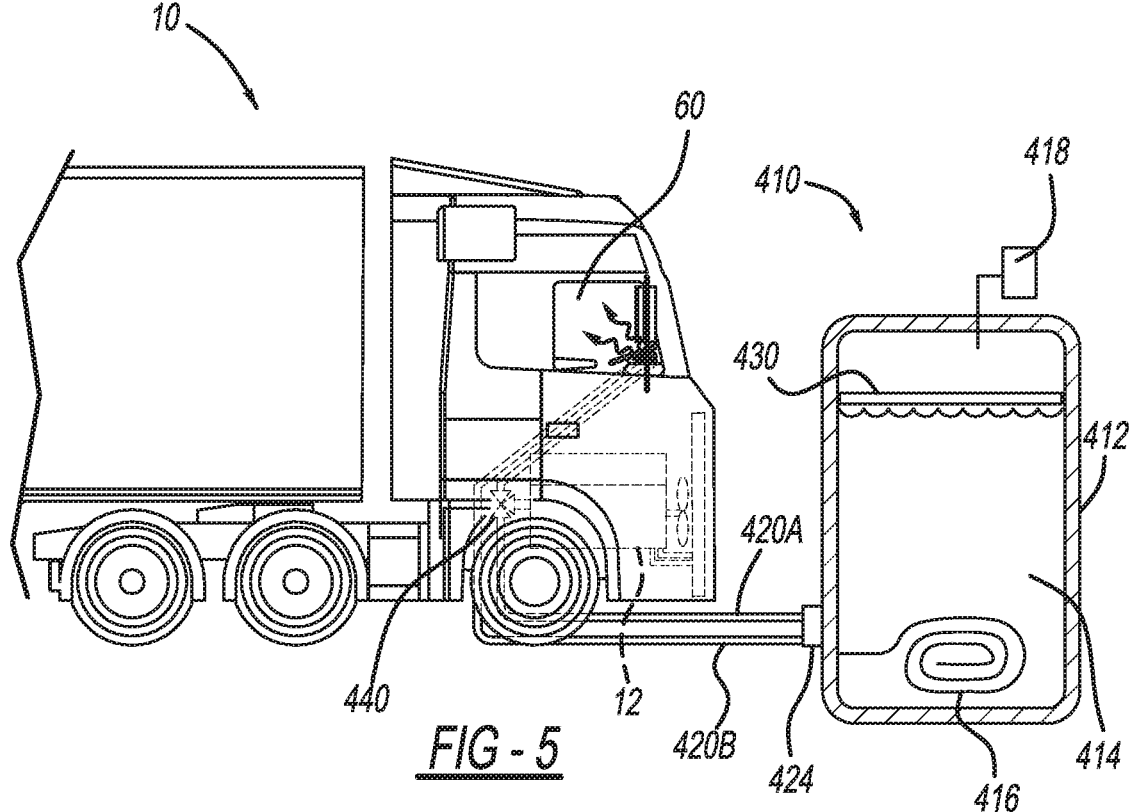

THERMAL ENERGY STORAGE SYSTEMS

FIELD

The present disclosure relates to thermal energy storage systems for vehicles, such as coolant thermal energy storage systems.

BACKGROUND

This section provides background information related to the present disclosure, which is not necessarily prior art.

Vehicle engines often include a liquid cooling system, which circulates coolant through pipes and passageways in the engine in order to regulate temperature of the engine. As the coolant is circulated through a warm engine, it absorbs heat in order to cool the engine. After the coolant exits the engine, it passes through a heat exchanger, or radiator, which transfers heat from the coolant to air blowing through the heat exchanger. Typical combustion engines run most efficiently when the coolant is about 200° F. (93° C.). At this optimal temperature, the engine's combustion chamber is warm enough to completely vaporize fuel, thereby optimizing combustion and reducing emissions.

During a cold engine start, the coolant is typically below this optimal temperature, which may undesirably result in reduced fuel economy and increased engine wear. Thus, onboard thermal energy storage systems exist for maintaining coolant at a predetermined temperature. While current onboard thermal energy storage systems are suitable for their intended use, they are subject to improvement. The present teachings advantageously provide for coolant thermal energy storage systems and methods that are more efficient, do not add weight, complexity, or cost to the vehicle, and provide increased fuel economy/emissions benefits over onboard thermal energy storage systems.

SUMMARY

This section provides a general summary of the disclosure, and is not a comprehensive disclosure of its full scope or all of its features.

The present teachings provide for thermal energy storage systems, such as for maintaining coolant of a vehicle engine at or above a predetermined target temperature. The thermal energy storage systems include a coolant tank that is external to the vehicle. The coolant tank is configured to receive coolant from the vehicle, and maintain the coolant at or above a predetermined temperature prior to the coolant being returned to the vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

FIG. 4 illustrates a thermal energy storage system for multiple vehicles according to the present teachings;

FIG. 5 illustrates a thermal energy storage system according to the present teachings configured to continuously circulate liquid between a tank and a vehicle;

Corresponding reference numerals indicate corresponding parts throughout the several views of the drawings.

DETAILED DESCRIPTION

Example embodiments will now be described more fully with reference to the accompanying drawings.

Figure 1:
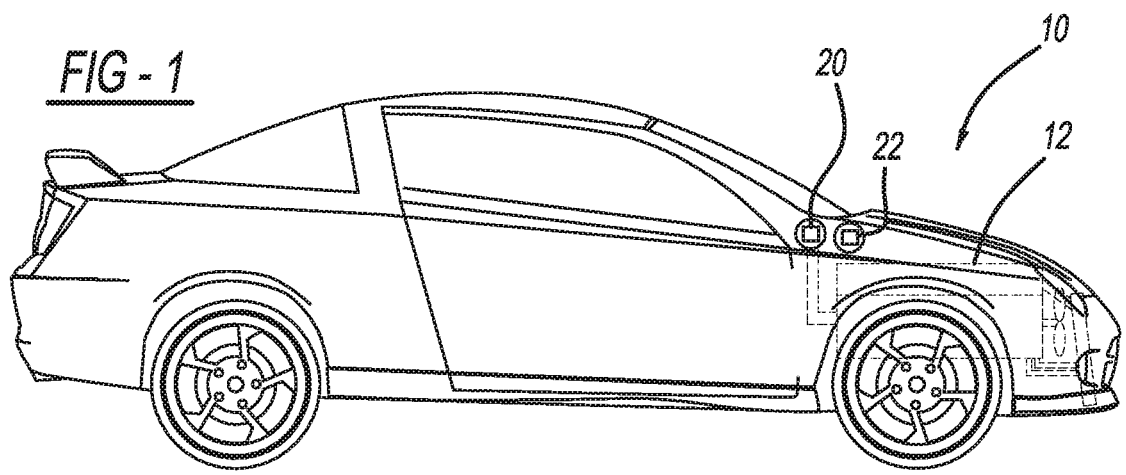
FIG. 1 illustrates an exemplary vehicle including a liquid inlet/outlet, such as for coolant, according to the present teachings.

With initial reference to FIG. 1, an exemplary vehicle 10 for use with a thermal energy storage system according to the present teachings is illustrated. Although the thermal energy storage system is generally described herein as a system that maintains coolant for a vehicle propulsion system at or above a predetermined temperature, the thermal energy storage system can also be adapted to store any other suitable liquid at or above any suitable predetermined temperature. For example, the present teachings can be adapted to store engine oil or automatic transmission oil at or above any suitable predetermined temperature.

When the present teachings are adapted to store coolant at or above a predetermined temperature, the vehicle 10 can be any suitable vehicle including a propulsion system 12 cooled by a liquid cooling system, such as a passenger vehicle, semi-truck (illustrated in FIG. 5, for example), mass transit vehicle, military vehicle, construction vehicle, etc. Any suitable coolant can be used, such as any suitable mixture of water and ethylene glycol. The vehicle 10 includes a coolant outlet/inlet 20, from which coolant can be drawn from, and/or pumped into, the vehicle 10 as further described herein. The coolant outlet/inlet 20 can be at any suitable location, such as at a bottom of the engine block of the engine 12, or at a side of the vehicle 10. The coolant outlet/inlet 20 can be both an inlet and an outlet, or an inlet separate from an outlet can be provided.

The vehicle 10 can be solely propelled by the engine 12. The vehicle 10 may alternatively be configured as a hybrid electric vehicle, battery electric vehicle, hydrogen fuel cell vehicle, etc., and thus may include an electric motor powered by onboard batteries. When configured as a hybrid, the vehicle 10 may include an EV outlet 22, configured to receive a plug of a charger. The coolant outlet/inlet 20 can be located proximate to EV plug outlet 22 for convenience when the vehicle 10 is a hybrid.

Figure 2:
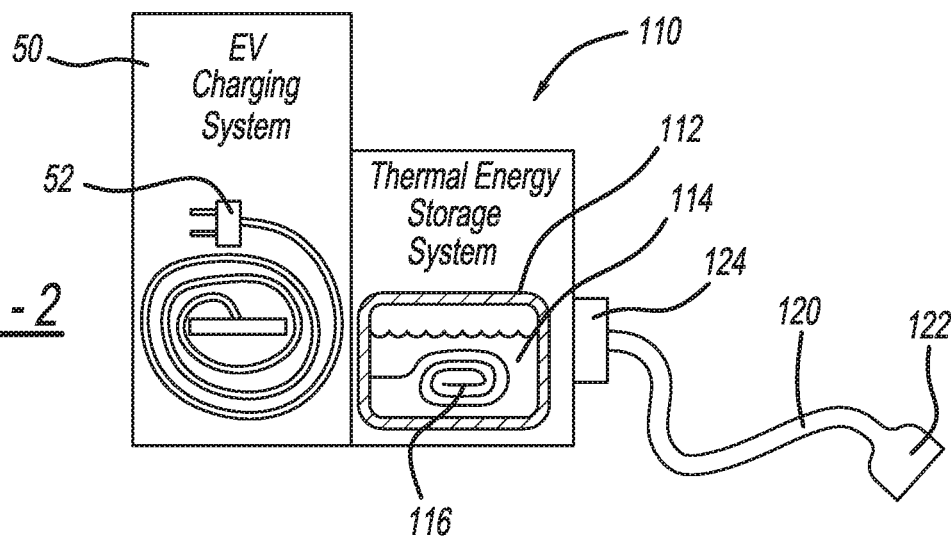
FIG. 2 illustrates an exemplary EV charging system and thermal energy storage system, such as for charging coolant, according to the present teachings.

FIG. 2 illustrates a thermal energy storage system according to the present teachings at reference numeral 110, which can be a coolant charging station. The system 110 includes a coolant tank 112, which is insulated in any suitable manner. The coolant tank 112 is configured to store coolant 114 therein, and maintain the coolant 114 at or above a predetermined temperature in any suitable manner, such as with any suitable heater 116. The heater 116 can be, for example, any suitable electric heating element or natural gas heater. A hose 120 extends from the tank 112 in order to draw coolant from, or deliver coolant to, the tank 112. A connector 122 is at a distal end of the hose 120. The connector 122 is configured to connect to the coolant outlet/inlet 20 of the vehicle 10, or any other suitable coolant outlet/inlet of the vehicle 10. With the connector 122 connected to the coolant outlet/inlet 20 of the vehicle 10, coolant can be drawn from the vehicle 10 into the tank 112. A pump 124 may be included in order to pump the coolant into the tank 112. The pump 124 may be any suitable pump arranged at any suitable position, such as on an outside of the tank 112, an inside of the tank 112, or attached to the hose 120. The coolant may also be pumped with a water pump of the vehicle 10.

Once coolant of the vehicle 10 has been transferred to the tank 112, the coolant can be maintained at or above a predetermined temperature in any suitable manner, such as by the heater 116. The predetermined temperature can be any suitable temperature, such as a temperature at which the particular engine 12 operates most efficiently, such as about 200° F. (93° C.). Shortly before the engine 12 is started, the coolant is pumped back to the vehicle 10, and specifically to the engine 12. Thus when the engine 12 is started, the coolant will help the engine quickly reach its optimal operating temperature, thereby improving fuel economy and reducing emissions.

The system 110 is advantageously separate from the vehicle 10, which allows the coolant 114 to be maintained at or above a predetermined temperature without adding additional weight, complexity, and cost to the vehicle 10. The system 110 can be provided at any suitable location, such as at a residence, business, roadside refueling station, truck stop, public parking lot, etc. The system 110 can be paired with an EV charging system 50. The EV charging system 50 can include a charging cable 52, which can plug into the EV plug outlet 22 in order to charge batteries of the vehicle 10.

Figure 3:
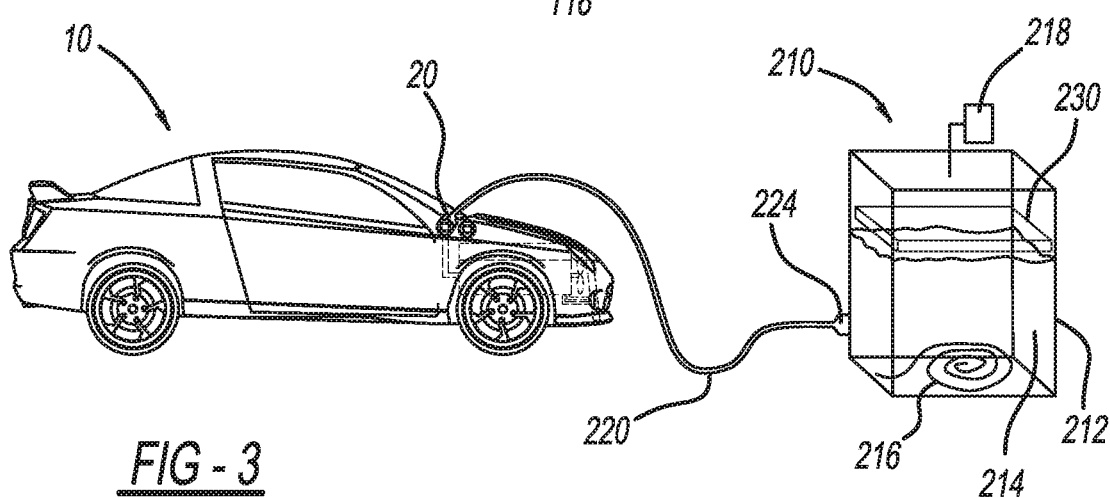
FIG. 3 illustrates a single vehicle thermal energy storage system according to the present teachings.

The general system 110 of FIG. 2 can be optimized/customized in any suitable manner for a variety of different applications. For example and with reference to FIG. 3, the present teachings provide for a thermal energy storage system 210 for a single conventional combustion engine vehicle. The system 210 operates in generally the same manner as the system 110, and thus the description above of the operation of the system 110 also applies to the system 210. Features of the system 210 that are similar to, or substantially similar to, the system 110 are designated in FIG. 3 with the same reference numbers, but increased by 100.

The system 210 includes an insulated tank 212 configured to store coolant 214, or any other suitable liquid, therein. Heater 216 can be any suitable heater configured to maintain the coolant 214 at or above a predetermined temperature, such as a gas or electric heater for example. The tank 212 can include a vacuum pump 218 configured to evacuate air from within the tank 212, in order to facilitate heat retention of the coolant 214. A lid 230 is configured to move up and down within the tank 212 as the amount of coolant 214 therein increases or decreases, which helps retain heat within the tank 212 and thereby improve the insulation capabilities of the tank 212. The lid 230 may be an insulated lid that floats on the coolant 214, or is otherwise configured to move with the coolant level in any suitable manner.

The tank 212 is connected to the vehicle 10 with any suitable connector, such as hose 220, which includes a connector 222. The hose 220 is substantially similar to the hose 120, and thus the hose 220 is designated with the same reference numerals, but increased by 100. Coolant 214 can be pumped between the vehicle 10 and the tank 212 in any suitable manner, such as with a pump 224, which is substantially similar to, or the same as, the pump 124.

With reference to FIG. 4, another thermal energy storage system according to the present teachings is illustrated at reference numeral 310. The system 310 includes an insulated tank 312 for coolant 314 or any other suitable liquid, and a heating element 316 configured to heat coolant 314 therein. The tank 312 includes a vacuum pump 318 and a lid 330 configured to float upon the coolant 314. The system 310 is substantially similar to the systems 110 and 210, and thus the description of the systems 110 and 210 substantially applies to the system 310. Unlike the system 210, the system 310 is configured to charge coolant of a plurality of vehicles 10A-10D simultaneously. Thus the tank 312 is larger than the tank 212, and is configured to store coolant 314, or any other suitable liquid, for more than one vehicle, such as for all of the vehicles 10A-10D.

A plurality of hoses 320A, 320B, 320C, and 320D individually connect each one of the vehicles 10A, 10B, 10C, and 10D respectively to the tank 312. The hoses 320A-320D can be connected to any suitable coolant outlet/inlet of the vehicles 10A-10D, such as the exemplary outlet/inlet 20 illustrated in FIG. 1. Pump 324 can be configured to pump coolant from each one of the vehicles 10A-10D to the tank 312, and from the tank 312 back to the vehicles 10A-10D. A single pump 324 can be included, or multiple pumps 324 can be included, such as one pump 324 for each one of the vehicles 10A-10D.

The system 110 advantageously provides a single tank 312 configured to warm the coolant 314 of the vehicles 10A-10D. For example, when the hoses 320A-320D are connected to the vehicles 10A-10D respectively, coolant 314 from each one of the vehicles 10A-10D is pumped by the pump 324 into the tank 312. At the tank 312, the coolant 314 from each one of the vehicles 10A-10D mixes together and is commonly heated by heating element 316, such as when the vehicles 10A-10D are parked overnight. Before any one or more of the vehicles 10A-10D is started, such as for a morning cold start, the pump 324 pumps the warmed coolant 314 to the one or more vehicles about to be started so as to bring the engine(s) thereof to their optimal operating temperatures more quickly. The system 310 is particularly useful for businesses having a fleet of vehicles, as well as residential users having more than one vehicle.

FIG. 5 illustrates another thermal energy storage system according to the present teachings at reference numeral 410. The system 410 includes an insulated tank 412, coolant 414, or any other suitable liquid, heating element 416, vacuum pump 418, and lid 430, each of which are configured in a manner substantially similar to that of the system 210, and thus elements of the system 410 that are substantially similar to, or the same as, the system 210 are illustrated in FIG. 5 with the same reference numerals as FIG. 3, but increased by 200. The system 410, unlike the system 210, includes an inlet hose 420A and an outlet hose 420B. The inlet and outlet hoses 420A and 420B are configured to couple with individual inlet and outlet coolant connectors of the vehicle 10, which can be provided at any suitable location of the vehicle 10. The pump 424 is configured to continuously circulate coolant 414 between the vehicle 10 and the tank 412, where the coolant 414 is stored at or above a predetermined temperature. Thus when the engine 12 of the vehicle 10 is off, a continuous supply of warm coolant 414 is provided to the vehicle 10 from the insulated tank 412.

Thermal energy from the warmed coolant 414 can be radiated throughout a passenger cabin 60 of the vehicle 10 so as to warm the passenger cabin even when the engine 12 of the vehicle 10 is off. This advantageously eliminates the need to keep the engine 12 at an idle in order to generate heat for the passenger cabin 60 when the vehicle 10 is parked. A three-way valve 440 is included, which connects the tank 412, engine 12, and fluid flow path that circulates coolant to and from the passenger cabin 60. The three-way valve 440 provides for at least two different modes of operations: a first mode in which coolant flowing from the engine 12 is directed to the tank 412, and flow of coolant to the passenger cabin 60 is blocked; and a second mode of operation in which coolant flow to the engine 12 is blocked, and coolant from the tank 412 is directed to circulate through the passenger cabin 60. An exemplary application for the system 410 is at a truck stop or rest stop, where the vehicle 10, which can be configured as a semi-truck as illustrated in FIG. 5, can connect to the insulated tank 412. The vehicle 10 can receive a continuous flow of warm coolant 414 to supply heat to the passenger cabin 60 while the engine 12 is off. This eliminates the need to idle the engine 12 for an extended period of time, such as when the driver is resting or sleeping, thereby saving on fuel costs and reducing emissions.

Figure 6:
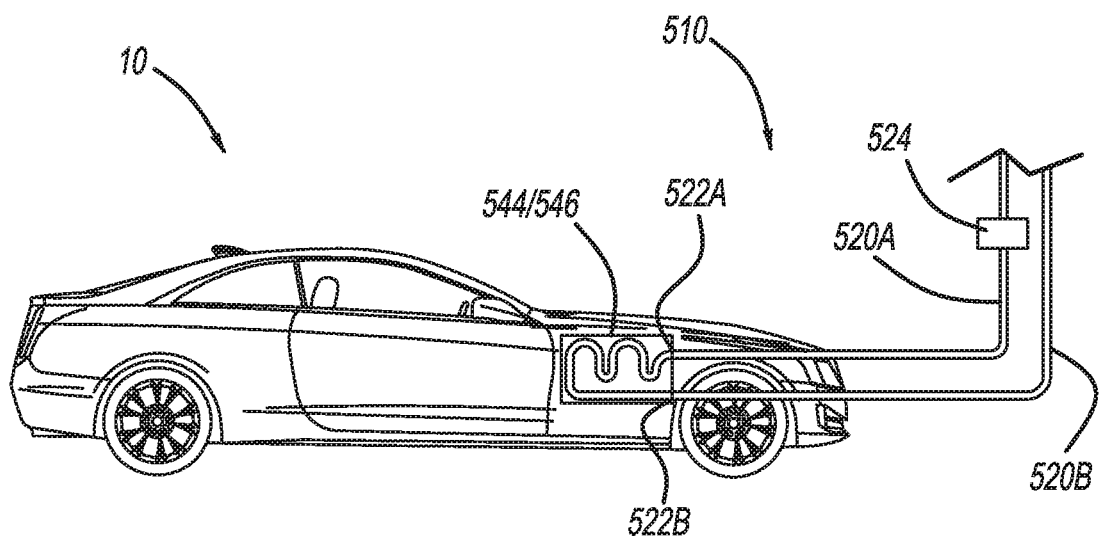
FIG. 6 illustrates a thermal energy storage system according to the present teachings configured to continuously circulate water between a hot water supply and the vehicle.

FIG. 6 illustrates another thermal energy storage system according to the present teachings at reference numeral 510. The system 510 is configured to connect to any suitable hot water supply remote to the vehicle 10, such as a residential or commercial building hot water tank. Warm water at or above the predetermined temperature is circulated between the water supply and the vehicle 10 in any suitable manner, such as by outlet hose 520A and inlet hose 520B. A pump 524 can be arranged along the hoses 520A and 520B in order to pump water from and to the remote hot water supply. The outlet hose 520A can be coupled to an inlet 522A of the vehicle 10, and the inlet hose 520B can be coupled to an outlet 522B of the vehicle 10. The inlet and outlet 522A and 522B of the vehicle 10 can be arranged at any suitable location of the vehicle 10. For example, the inlet and outlet 522A/522B can be configured to direct hot water from the hot water supply directly to and from an engine block 544 of the engine 12, so as to circulate the hot water through the engine block 544 to heat the engine 12. Alternatively, the inlet and outlet 522A and 522B can be configured to direct hot water from the hot water supply to a water-coolant heat exchanger 546 of the vehicle 10. The water-coolant heat exchanger 546 is configured to transfer thermal energy from the hot water to coolant of the engine 12 in order to heat the coolant of the engine 12 to its optimal temperature. The hot water can be continuously circulated from the hot water supply to the vehicle 10 so as to maintain the coolant of the vehicle 10 at its optimal temperature when the vehicle 10 is parked, such as parked overnight at the driver's residence, so that the coolant is at its optimal temperature when the driver starts the vehicle 10.

Figure 7:
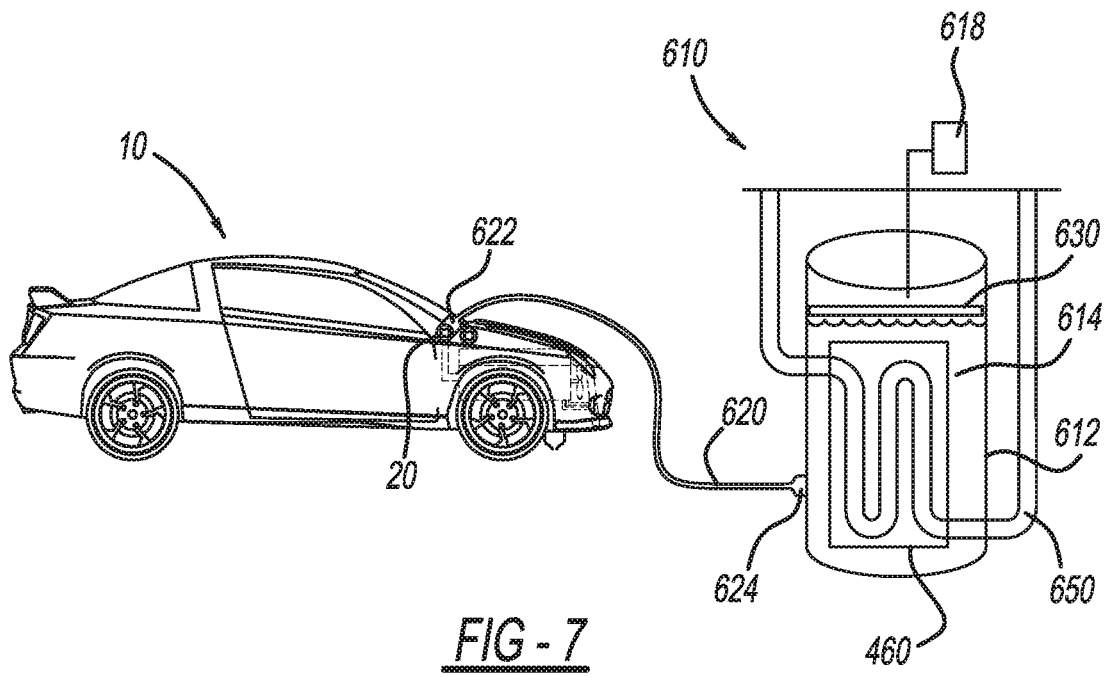
FIG. 7 illustrates a thermal energy storage system according to the present teachings including a heat exchanger in a tank.

FIG. 7 illustrates another coolant thermal energy storage system according to the present teachings at reference numeral 610. The system 610 includes an insulated tank 612 configured to store coolant 614, or any other suitable liquid, therein. The tank 612 includes a vacuum pump 618. A lid 630 floats atop the coolant 614. The vacuum pump 618 and lid 630 are substantially similar to the vacuum pump 218 and lid 230 described above, and thus the description of the vacuum pump 218 and the lid 230 also applies to the vacuum pump 618 and the lid 630. Hose 620, connector 622, and pump 624 are similar to the hose 220, connector 222, and pump 224 respectively, and thus the description set forth above of the hose 220, connector 222, and pump 224 also applies to the hose 620, connector 622, and pump 624.

Unlike the system 210, the system 610 includes a heating element in the form of a hot water pipe 650. The hot water pipe 650 can be any suitable hot water pipe, such as a hot water pipe of any suitable building, such as a residence. The hot water pipe 650 can be configured in any suitable manner in order to supply water to a water to coolant heat exchanger 460 located inside the tank 612 to heat coolant 614 within tank 612 and maintain the coolant 614 at or above the predetermined temperature. For example, the hot water pipe 650 can extend through or around the tank 612. As hot water passes through the hot water pipe 650, thermal energy thereof is transferred to coolant 614 within the tank 612 so as to heat the coolant 614 and maintain the coolant 614 at or above the predetermined temperature. Conversely, coolant heated by the engine 12 can heat water within the pipe 650 when hot coolant is pumped from the engine 12 to the tank 612 just after the engine 12 is turned off. Thus when the pipe 650 is a water pipe of a home hot water supply, for example, using warm coolant from the vehicle 10 to heat water of the home hot water supply advantageously reduces the homeowner's energy bill.

The present teachings provide numerous advantages. For example, by arranging the tanks 112, 212, 312, 412, and 612 stationary and external to the vehicle 10 it is possible to increase storage capacity, improve thermal insulation, and maintain the coolant, or any other suitable liquid, at an elevated temperature more efficiently as compared to onboard systems for storing liquids at or above a predetermined temperature.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A thermal energy storage system for a vehicle comprising:
   a tank external to the vehicle configured to receive liquid from the vehicle;
   a heater included with the tank, the heater is configured to warm the liquid within the tank; and
   a pump configured to pump the liquid out of a propulsion system of the vehicle and into the tank when the propulsion system is off to allow the liquid to be warmed by the heater in the tank, circulate the warmed liquid about a passenger cabin of the vehicle where heat radiates from the liquid to heat the passenger cabin while the propulsion system is off, and pump the liquid back into the propulsion system just prior to a cold start.

2. The thermal energy storage system of claim 1, further comprising a hose extending from the tank, the hose including a connector configured to connect to an outlet of the vehicle to transport the liquid between the vehicle and the tank.

3. The thermal energy storage system of claim 1, wherein the liquid is one of coolant, engine oil, and transmission fluid.

4. The thermal energy storage system of claim 1, wherein liquid from the different vehicles is mixed in the tank.

5. The thermal energy storage system of claim 1, wherein liquid is continuously circulated between the tank and the vehicle, and thermal energy from the liquid is directed to a passenger cabin of the vehicle to heat the passenger cabin.

6. The thermal energy storage system of claim 1, wherein liquid within the tank is warmed at a heat exchanger within the tank, the heat exchanger in receipt of water passing through a water pipe.

7. The thermal energy storage system of claim 1, wherein liquid warmed by an engine of the vehicle is pumped from the vehicle to a building water system to heat water of the building water system.

8. A thermal energy storage system for coolant of a vehicle, the system comprising:
   a propulsion system of the vehicle;
   a coolant tank external to the vehicle;
   a heater configured to heat coolant within the coolant tank, the heater includes a heat exchanger within the coolant tank, the heat exchanger configured to exchange thermal energy between water of a hot water pipe extending through the tank and the coolant;
   a hose extending from the coolant tank and including a connector at a distal end thereof configured to cooperate with a coolant outlet of the vehicle; and
   a pump configured to pump coolant from the vehicle to the coolant tank to allow the coolant to be warmed by the heater in the coolant tank, and pump the coolant from the coolant tank back to the vehicle and circulate the warmed coolant about a passenger cabin of the vehicle where heat radiates from the warmed coolant to heat the passenger cabin while the propulsion system is off.

9. The thermal energy storage system of claim 8, wherein the heater is one of a gas heater and an electric heater.

10. A thermal energy storage system for a plurality of vehicles comprising:
   a tank external to the vehicles configured to receive liquid from the vehicles, where liquid from the different vehicles is mixed within the tank;
   a heater included with the tank, the heater is configured to warm the liquid;
   a plurality of hoses extending from the tank, each one of the plurality of hoses configured to connect to a different one of the plurality of vehicles to convey liquid from the vehicles to the tank, and from the tank back to the vehicles; and
   a pump configured to pump the liquid out of a propulsion system of each one of the vehicles and into the tank when the propulsion systems are off and circulate the warmed liquid about a passenger cabin of each one of the vehicles where heat radiates from the liquid to heat the passenger cabin of each one of the vehicles while the propulsion systems are off, and pump the liquid back into the propulsion systems just prior to a cold start.

* * * * *